(12) United States Patent
Sato et al.

(10) Patent No.: US 8,106,621 B2
(45) Date of Patent: Jan. 31, 2012

(54) CONTROL DEVICE FOR INDUCTION MOTOR

(75) Inventors: Sadayuki Sato, Kitakyushu (JP); Hideaki Iura, Kitakyushu (JP); Yoichi Yamamoto, Kitakyushu (JP); Kozo Ide, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 400 days.

(21) Appl. No.: 12/490,220

(22) Filed: Jun. 23, 2009

(65) Prior Publication Data

US 2010/0085006 A1    Apr. 8, 2010

(30) Foreign Application Priority Data

Oct. 2, 2008  (JP) .................................. 2008-257015

(51) Int. Cl.
*H02P 23/00*    (2006.01)

(52) U.S. Cl. ........................................ 318/811; 318/599

(58) Field of Classification Search .................. 318/811, 318/599, 432, 798, 800, 801, 805, 807
See application file for complete search history.

(56) References Cited

U.S. PATENT DOCUMENTS

| | | | | |
|---|---|---|---|---|
| 4,757,240 A | * | 7/1988 | Mizobuchi et al. | 318/52 |
| 5,066,899 A | * | 11/1991 | Nashiki | 318/807 |
| 5,898,287 A | * | 4/1999 | Roberti et al. | 318/605 |
| 6,242,885 B1 | * | 6/2001 | Ide et al. | 318/811 |
| 6,856,115 B2 | * | 2/2005 | Branecky | 318/727 |
| 2002/0041171 A1 | | 4/2002 | Cho | |

FOREIGN PATENT DOCUMENTS

| JP | 2002-125400 | 4/2002 |
|---|---|---|
| JP | 2002-253000 | 9/2002 |

OTHER PUBLICATIONS

Hisao Kubota et al., "Rotor Resistance Adaptation for Sensorless Vector Controlled Induction Machines", T. IEE Japan, vol. 117-D, No. 8, '97, pp. 940-945 (w/ English abstract).

* cited by examiner

*Primary Examiner* — Rina Duda
(74) *Attorney, Agent, or Firm* — Ditthavong Mori & Steiner, P.C.

(57) ABSTRACT

A control device includes a slip calculator that calculates a first slip frequency of an induction motor, a current detector that detects motor current that passes through the induction motor, an adder that calculates a primary frequency by adding a speed command and a second slip frequency that are given, a command voltage generation unit that generates first command voltage from the primary frequency, a voltage error observer unit that estimates a command voltage error from the first command voltage and the motor current, a slip correction unit that calculates a slip correction amount from the command voltage error, an adder that calculates the second slip frequency by adding the first slip frequency and the slip correction amount, and a voltage error correction unit that corrects the first command voltage using the command voltage error and outputs second command voltage.

8 Claims, 3 Drawing Sheets

CONTROL DEVICE FOR INDUCTION MOTOR

CROSS-REFERENCES TO RELATED APPLICATION

The present application is related to Japanese Patent application no. 2008-257015 filed at Japan Patent Office titled "Induction Motor Controller and Its Control Method", all of which are incorporated herein by reference.

BACKGROUND OF THE INVENTION

1. Field of the Invention

The present invention relates to a control device that controls an induction motor without using a speed sensor and a control method of the control device.

2. Description of Related Art

In general slip frequency type speed-sensorless control, a primary frequency is calculated by adding a slip frequency to estimated motor speed, and a magnetic flux phase is calculated by integrating the primary frequency. The slip frequency is calculated on the basis of set secondary resistance. A value measured using an auto-tuning method, a value obtained by a combined test, or a motor design value is used as the value of the secondary resistance.

When a motor is driven, the value of the secondary resistance varies with a change in temperature. Thus, the slip frequency cannot be correctly calculated. For example, "Rotor Resistance Adaptation for Sensorless Vector Controlled Induction Machines", H. Kubota et al. (T. IEE Japan, Vol. 117-D, No. 8, 1997, pp. 940-945) proposes, as a solution to this problem, obtaining the value of secondary resistance by applying high frequency components to d-axis current while driving a motor and separating a speed error from a secondary speed error.

Moreover, a method in which a thermistor is built into a motor, primary resistance is directly measured using the thermistor, and the value of secondary resistance varying with temperature is obtained, assuming that the rate at which the primary resistance varies with temperature is equal to the rate at which the secondary resistance varies with temperature, is also known.

Moreover, for example, Japanese Unexamined Patent Application Publication No. 2002-125400 proposes, as a method for identifying primary resistance without using a thermistor, estimating primary resistance from two-phase voltage of direct-current components generated upon receipt of a command value, two-phase current converted from motor current, and the estimates of magnetic flux and speed.

Moreover, Japanese Unexamined Patent Application Publication No. 2002-253000 proposes defining an hv-axis rotating coordinate system that is delayed from a dq-axis rotating coordinate system by a phase angle θhv equal to a primary current phase angle θIdq, calculating an h-axis induced voltage error dEh and a v-axis induced voltage error dEv, and correcting the set value of primary resistance so that the calculated v-axis induced voltage error dEv converges to zero.

SUMMARY OF THE INVENTION

A control device according to a first aspect of the present invention includes a pulse width modulation (PWM) inverter unit that drives an induction motor by outputting command voltage, a current detector that detects motor current that passes through the induction motor, a voltage error observer unit that estimates a command voltage error using the command voltage and the motor current, a voltage error correction unit that corrects the command voltage using the command voltage error, and a slip correction unit that calculates a slip correction amount using the command voltage error and corrects a slip frequency.

A control method according to a second aspect of the present invention for a control device that includes a PWM inverter unit that drives an induction motor by outputting command voltage is provided. The method includes detecting motor current that passes through the induction motor, estimating a command voltage error using the command voltage and the motor current, correcting the command voltage using the command voltage error, calculating a slip correction amount using the command voltage error, and correcting a slip frequency using the slip correction amount.

BRIEF DESCRIPTION OF THE DRAWINGS

Exemplary embodiments of the present invention will be described in detail on the basis of the following figures, wherein.

DESCRIPTION OF THE PREFERRED EMBODIMENTS

Figure 1:
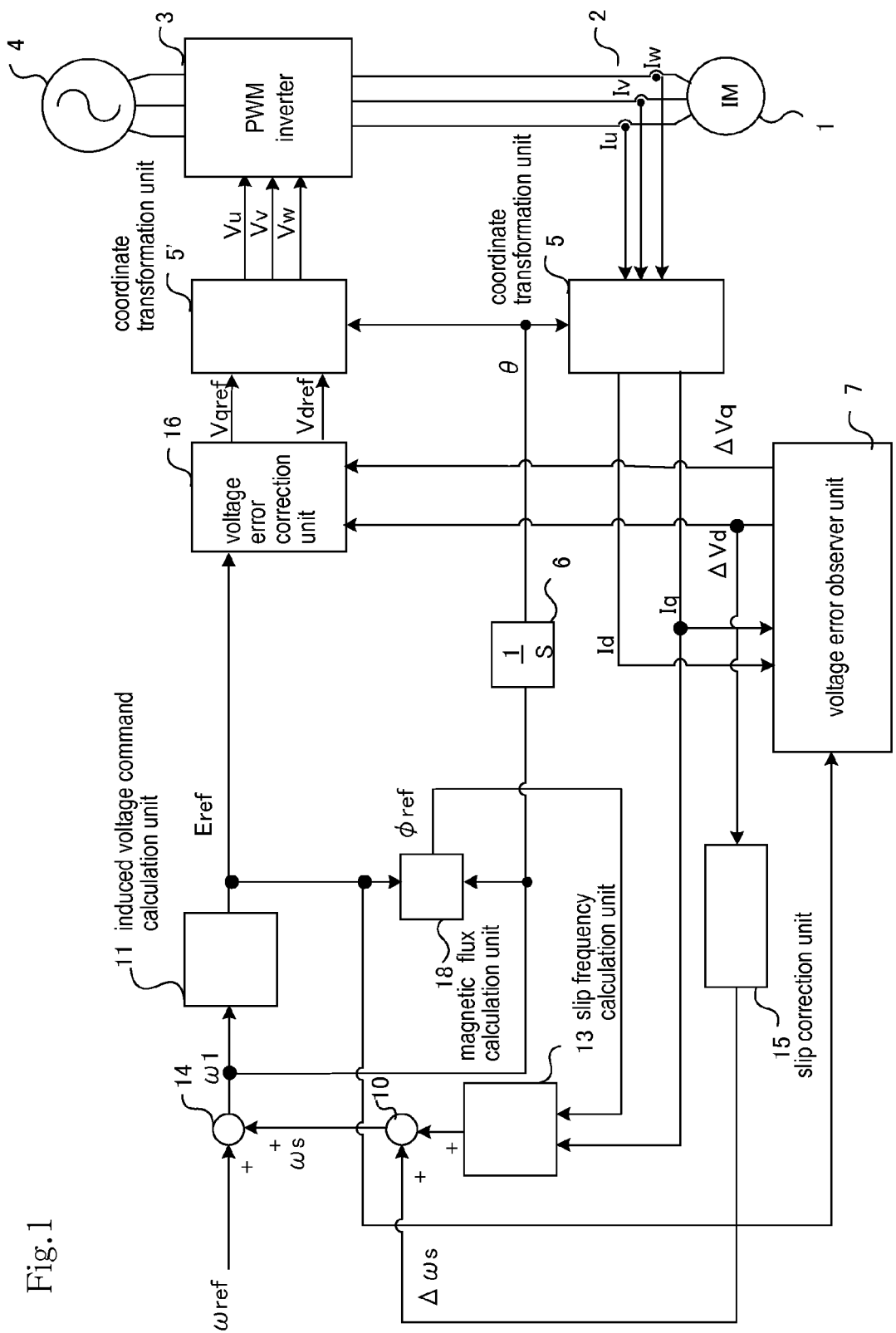
FIG. 1 is a block diagram of a control device according to a first embodiment of the present invention for an induction motor.

The principle of the present invention will first be described.

Voltage and current equations of an induction motor in a stationary reference frame with reference to a stator can be expressed as equations (1) and (2):

$$\frac{d}{dt}i_s = -\frac{(R'_r + R_s)}{\sigma L_s}i_s + \left(\frac{R'_r}{\sigma L_s M} - j\frac{M}{\sigma L_s L_r}\omega_r\right)\phi_r + \frac{1}{\sigma L_s}v_s \quad (1)$$
$$= a_{r11}i_s + (a_{r12} - ja_{i12})\phi_r + bv_s$$

$$\frac{d}{dt}\phi_r = -\frac{M}{T_r}i_s + \left(-\frac{1}{T_r} + j\omega_r\right)\phi_r \quad (2)$$
$$= a_{r21}i_s + (a_{r22} + ja_{i22})\phi_r$$

in this case, $i_s = i_d + ji_q$, $\phi_r = \phi_d + j\phi_q$ where $i_s$ is motor current, $V_s$ is motor voltage, $\phi_r$ is motor magnetic flux, $R_s$ is primary resistance (Ω), $R_r$ is secondary resistance (Ω), $\sigma L_s$ is leakage inductance (H), $L_r$ is secondary self-inductance (H), M is mutual inductance (H), $T_r$ is a secondary time constant (s), $R_r'$ is secondary resistance converted to the primary side, $R_r(M/L_r)^2$ (Ω), and $\omega_r$ is motor speed (rad/s).

Equation (3) is derived by transforming equations (1) and (2) into a rotating coordinate system (a dq coordinate system).

$$\frac{d}{dt}\begin{bmatrix} i_s \\ \phi_r \end{bmatrix} = \begin{bmatrix} a_{r11} - j\omega_1 & a_{r12} - ja_{i12} \\ a_{r21} & a_{r22} - j(\omega_1 - \omega_r) \end{bmatrix}\begin{bmatrix} i_s \\ \phi_r \end{bmatrix} + \begin{bmatrix} b \\ 0 \end{bmatrix}v_s \quad (3)$$

Command voltage $V_{ref}$ is given so that the motor voltage $V_s$ has a value shown in equation (4).

$$v_{ref} = (R_{s0} + j\omega_1 \sigma L_{s0})i_s + \begin{bmatrix} 0 \\ E_{ref} \end{bmatrix} \quad (4)$$

The first term on the right hand side of equation (4) corresponds to the amount of primary impedance voltage drop of a motor, and the second term corresponds to motor induced voltage. A subscript 0 in equation (4) represents a set value.

However, in an actual operation, a set value does not coincide with an actual value ($R_{s0} \neq R_s$, $\sigma L_{s0} \neq \sigma L_s$). Thus, assuming that the actual motor voltage $V_s$ differs from the command voltage $V_{ref}$ shown by equation (4) by a voltage error $\Delta V$, equation (5) is obtained by changing equations (3) and (4).

$$\frac{d}{dt}\begin{bmatrix} i_s \\ \phi_r \end{bmatrix} = \begin{bmatrix} -\frac{R'_r}{\sigma L_s} & a_{r12} - ja_{i12} \\ a_{r21} & a_{r22} - j(\omega_1 - \omega_r) \end{bmatrix} \begin{bmatrix} i_s \\ \phi_r \end{bmatrix} + \begin{bmatrix} b \\ 0 \end{bmatrix} v_e + \begin{bmatrix} 1 \\ 0 \end{bmatrix} \Delta V \quad (5)$$

$$\Delta V = \begin{bmatrix} \left\{ \left( \frac{R_{s0}}{\sigma L_{s0}} - \frac{R_s}{\sigma L_s} \right) + j\omega_1 \left( \frac{\sigma L_{s0}}{\sigma L_s} - 1 \right) \right\} i_s \\ 0 \end{bmatrix}$$

In this case, the voltage error $\Delta V$ can be obtained using a voltage error observer expressed by equation (6).

$$\frac{d}{dt}\begin{bmatrix} \hat{i}_s \\ \hat{\phi}_r \\ \Delta \hat{V} \end{bmatrix} = A \cdot \begin{bmatrix} \hat{i}_s \\ \hat{\phi}_r \\ \Delta \hat{V} \end{bmatrix} + B \cdot v_e + L(i_s - \hat{i}_s) \quad (6)$$

where $V_e$ is input voltage, A and B are motor parameters, and L is observer gain (A, B, and L are matrices), a character ˆ indicates that a corresponding variable is an estimated value, and the input voltage $V_e$ is a matrix $[0\ E_{ref}]^T$ ($^T$ represents a transposed matrix).

Then, assuming that the leakage inductance $\sigma L_s$ can be correctly set ($\sigma L_{s0} = \sigma L_s$), and the primary resistance $R_s$ has a setting error $\Delta R_s$, the voltage error $\Delta V$ in equation (5) is expressed by equation (7) where the voltage error is $\Delta V1$.

$$\Delta V1 \cong \begin{bmatrix} \left( \frac{\Delta R_s}{\sigma L_{s0}} \right) i_s \\ 0 \end{bmatrix} \quad (7)$$

A change in motor temperature due to driving of a motor will next be considered. Assuming that the setting error of the primary resistance $R_s$ becomes $\Delta R_s + \Delta R_{sd}$ due to a change in motor temperature, the voltage error $\Delta V$ in equation (5) is expressed by equation (8) where the voltage error is $\Delta V2$. Assuming that a change in motor temperature influences the primary resistance $R_s$ and the secondary resistance $R_r$ in the same manner, and setting is correctly performed under the same temperature condition before a motor is driven, equation (9) is derived. In this case, it is assumed that the setting error of the secondary resistance $R_r$ is $\Delta R_r$, and influence of a change in motor temperature is $\Delta R_{rd}$.

$$\Delta V2 \cong \begin{bmatrix} \left( \frac{\Delta R_s + \Delta R_{sd}}{\sigma L_{s0}} \right) i_s \\ 0 \end{bmatrix} \quad (8)$$

$$\Delta V2 - \Delta V1 \cong \begin{bmatrix} \left( \frac{\Delta R_{sd}}{\sigma L_{s0}} \right) i_s \\ 0 \end{bmatrix} \quad (9)$$

$$= \begin{bmatrix} \left( \frac{1}{\sigma L_{s0}} \frac{R_{s0}}{R_{r0}} \Delta R_{rd} \right) i_s \\ 0 \end{bmatrix}$$

In this manner, the change $\Delta R_{rd}$ of the secondary resistance with respect to temperature can be obtained by measuring and storing the voltage error $\Delta V1$ at a certain temperature, measuring the voltage error $\Delta V2$ while a motor is driven, and obtaining $\Delta V2 - \Delta V1$.

Embodiments of the present invention will now be described with reference to the drawings.

FIG. 1 is a block diagram of a control device I according to a first embodiment of the present invention for an induction motor.

The control device I includes a current detector 2 that detects phase currents $I_u$, $I_v$, and $I_w$ of motor currents that pass through a motor 1 and a pulse width modulation (PWM) inverter 3 the power supply of which is a three-phase alternating current power supply 4.

The control device I further includes a coordinate transformation unit 5 that transforms the phase currents $I_u$, $I_v$, and $I_w$ into a d-axis current $I_d$ and a q-axis current $I_q$ of a rotating coordinate system, using an electrical angle θ described below, and a coordinate transformation unit 5' that transforms the command voltage $V_{ref} = [V_{dref}\ V_{qref}]^T$ ($V_{dref}$: d-axis command voltage, $V_{qref}$: q-axis command voltage) described below into three-phase command voltages $V_u$, $V_v$, and $V_w$ of a stationary reference frame, using the electrical angle θ.

The control device I further includes an integrator 6 that calculates the electrical angle θ by integrating a primary frequency command $\omega_1$ described below, a voltage error observer unit 7 that calculates voltage errors $\Delta V_d$ and $\Delta V_q$, and an induced voltage command calculation unit 11 that calculates an induced voltage command $E_{ref}$ receiving the primary frequency command $\omega_1$ as input.

The control device I further includes a slip frequency calculation unit 13 that calculates a first slip frequency, using the set secondary resistance $R_r$ and a magnetic flux command $\phi_{ref}$ and the q-axis current $I_q$ that are given, an adder 10 that calculates a new slip frequency $\omega_s$ by adding the first slip frequency and a slip correction amount $\Delta \omega_s$ described below, and an adder 14 that calculates the primary frequency command $\omega_1$ by adding a speed command and the newly calculated slip frequency $\omega_s$ subjected to correction that are given.

The control device I further includes a slip correction unit 15 to which the d-axis voltage error $\Delta V_d$ is input and that outputs the slip correction amount $\Delta \omega_s$, a voltage error correction unit 16, and a magnetic flux calculation unit 18. The PWM inverter 3 drives the motor 1 by applying the three-phase command voltages $V_u$, $V_v$, and $V_w$ to the motor 1.

The voltage error correction unit 16 obtains the command voltage $V_{ref} = [V_{dref}\ V_{qref}]^T$ by substituting the induced voltage command $E_{ref}$ and the voltage errors $\Delta V_d$ and $\Delta V_q$ output from the voltage error observer unit 7 into, for example, equations (10) and outputs the command voltage $V_{ref} = [V_{dref}\ V_{qref}]^T$ to the PWM inverter 3.

$$V_{dref} = \Delta V_d$$

$$V_{qref} = E_{ref} - \Delta V_q \quad (10)$$

The magnetic flux calculation unit 18 calculates the magnetic flux command $\phi_{ref}$, using the induced voltage command $E_{ref}$ and the primary frequency command $\omega_1$.

The voltage error observer unit 7 will next be described.

The voltage error observer unit 7 implements equation (6) described above in the principle. The respective values of the leakage inductance $\sigma L_{s0}$ and the primary resistance $R_{s0}$ are preset in the voltage error observer unit 7. Then, the induced voltage command $E_{ref}$ from the induced voltage command calculation unit 11 and the d-axis current $I_d$ and the q-axis current $I_q$ from the coordinate transformation unit 5 are input to the voltage error observer unit 7. The primary frequency command $\omega_1$ may be input to the voltage error observer unit 7 or may be obtained from the input induced voltage command $E_{ref}$ by the reverse calculation.

The voltage error observer unit 7 obtains the voltage errors $\Delta V_d$ and $\Delta V_q$, which are the d and q components of the voltage error $\Delta V$, according to equation (6), using these set values and input values. The voltage errors $\Delta V_d$ and $\Delta V_q$ are output to the voltage error correction unit 16, and the voltage error $\Delta V_d$ is output to the slip correction unit 15.

Specific operations of the slip correction unit 15 will next be described, using FIG. 2.

Figure 2:
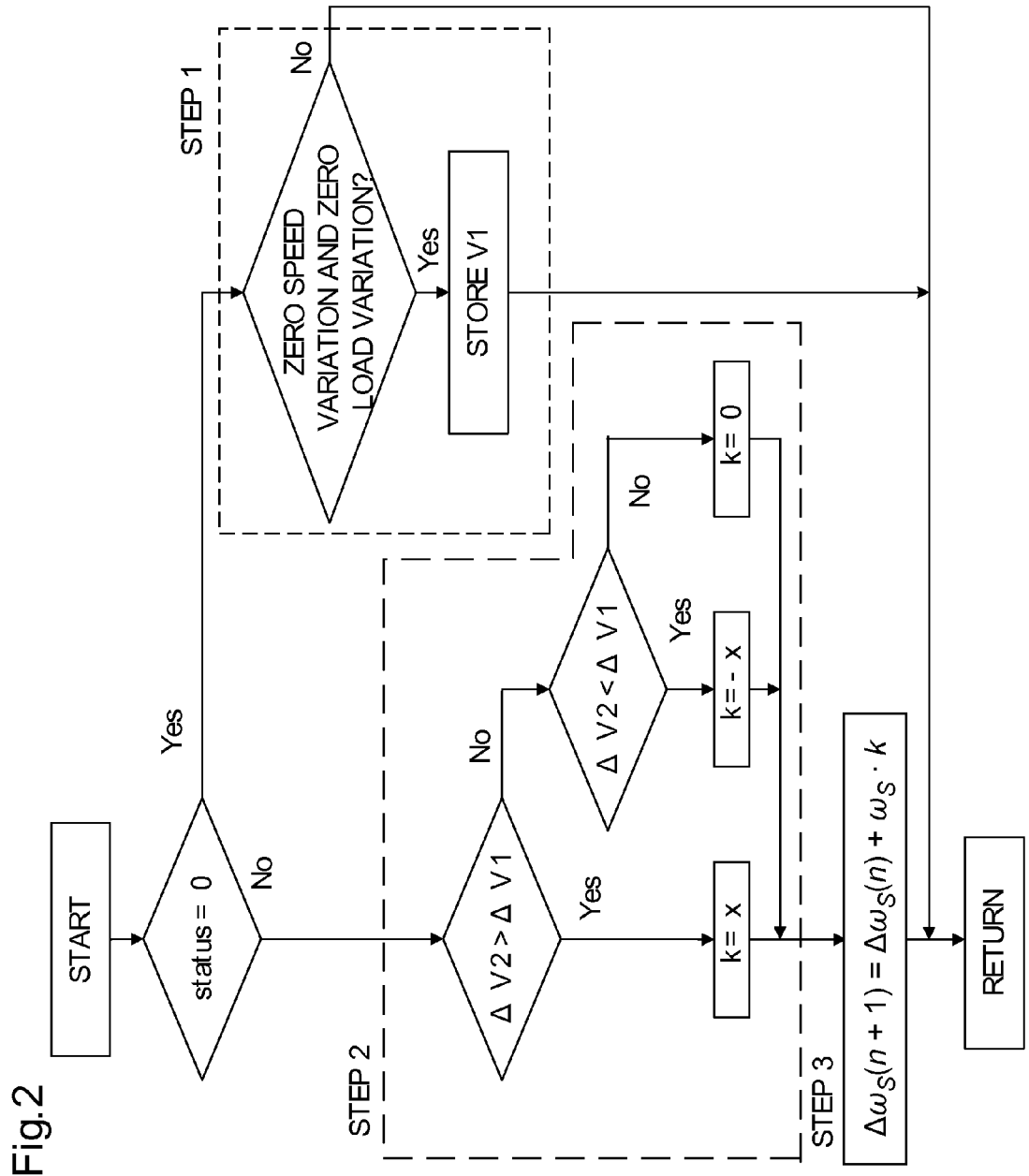
FIG. 2 is a flowchart showing procedure in a slip correction unit according to the first embodiment.

FIG. 2 is a flowchart showing the procedure for obtaining the slip correction amount $\Delta \omega_s$ in the slip correction unit 15.

When status is zero, the slip correction unit 15 performs STEP 1.

In STEP 1, the slip correction unit 15 stores the d-axis voltage error $\Delta V_d$ input from the voltage error observer unit 7 as the voltage error $\Delta V1$ and sets the status to one.

In order to eliminate setting error factors of the primary resistance $R_s$ from the voltage error $\Delta V1$, after a condition in which the speed and load of a motor do not vary is achieved, the slip correction unit 15 performs the aforementioned operation.

In this case, a condition in which the speed does not vary is assumed to be a condition in which the variation of the primary frequency command $\omega_1$ is equal to or less than a predetermined value, or a speed command is constant. A condition in which the load does not vary is assumed to be a condition in which the variation of the q-axis current $I_q$ is kept equal to or less than a predetermined value for a predetermined time. When the variation is obtained, a value subjected to filtering may be used.

When the status is one, the slip correction unit 15 performs STEP 2.

In STEP 2, the slip correction unit 15 considers the d-axis voltage error $\Delta V_d$ successively output from the voltage error observer unit 7 as the voltage error $\Delta V2$ and compares the voltage error $\Delta V2$ with the voltage error $\Delta V1$ stored in STEP 1.

When $\Delta V2 > \Delta V1$, a correction amount is x. When $\Delta V2 < \Delta V1$, the correction amount is -x. When $\Delta V2 = \Delta V1$, the correction amount is zero. The slip correction unit 15 sets the correction amount to a variable k, and the process proceeds to STEP 3. In this case, x is a positive number.

The voltage error $\Delta V2$ increases when $\Delta R_{sd}$ is a plus due to an increase in motor temperature, and the voltage error $\Delta V2$ decreases when $\Delta R_{sd}$ is a minus due to a decrease in motor temperature. Thus, $\Delta V2 > \Delta V1$ represents a direction in which motor temperature increases, and $\Delta V2 < \Delta V1$ represents a direction in which motor temperature decreases.

In this case, the difference between $\Delta V1$ and $\Delta V2$ is less than a predetermined value, it may be determined that motor temperature has not changed, and thus speed error correction may not be performed.

In STEP 3, the slip correction unit 15 obtains the present slip correction amount $\Delta \omega_s(n+1)$ by incorporating the variable k obtained in STEP 2 into the previous slip correction amount $\Delta \omega_s(n)$, as shown in equation (11).

$$\Delta \omega_s(n+1) = \Delta \omega_s(n) + \omega_{s0} \cdot k \quad (11)$$

where $\omega_{s0}$ is a slip frequency (rad/s) at rated load and rated magnetic flux (hereinafter called a rated slip frequency).

When the slip correction amount $\Delta \omega_s(n+1)$ is output, in order to avoid overcompensation due to unexpected factors, for example, the slip correction amount $\Delta \omega_s(n+1)$ may be limited to up to +/-50% of the rated slip frequency $\omega_{s0}$.

In this case, when setting of the primary resistance $R_{s0}$ is changed, the aforementioned status is reset.

In this manner, the slip correction unit 15 obtains the slip correction amount $\Delta \omega_s$.

Since the control device according to the first embodiment of the present invention for an induction motor is constructed as described above, the following operational advantage is achieved.

In a control method for an induction motor performed using V/f control, a voltage error observer is provided, and output command voltage and a slip frequency command are corrected, using a command voltage error. Thus, stable speed control in which, even when motor temperature changes, the accuracy of speed control does not deteriorate, can be achieved.

Figure 3:
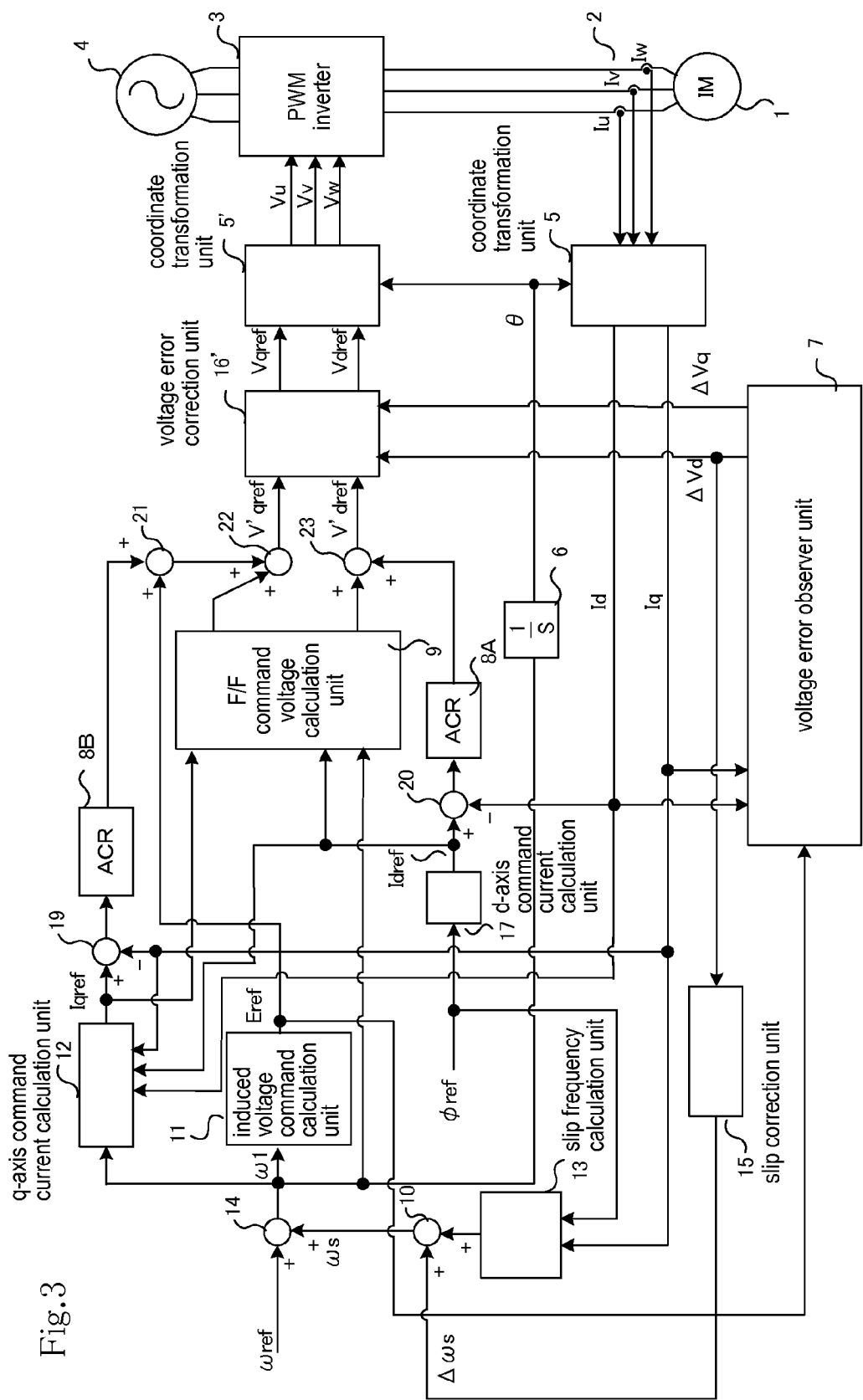
FIG. 3 is a block diagram of a control device according to a second embodiment of the present invention for an induction motor.

FIG. 3 is a block diagram showing the components of a control device according to a second embodiment of the present invention for an induction motor. FIG. 3 is different from FIG. 1 in that current control units 8A and 8B, an F/F command voltage calculation unit 9, and peripheral circuits are additionally provided, and a d-axis command current calculation unit 17 calculates the magnetic flux command $\phi_{ref}$. The peripheral circuits are a q-axis command current calculation unit 12, subtracters 19 and 20, and adders 21, 22, and 23. Moreover, the reference numeral of the voltage error correction unit is changed from 16 to 16', and there are differences in some operations. The same reference numerals as in FIG. 1 are assigned to corresponding components that operate in the same manners as in FIG. 1, and the description is omitted here.

The second embodiment will now be described, focusing on the differences between the first embodiment and the second embodiment.

The d-axis command current calculation unit 17 calculates d-axis command current $I_{dref}$ by dividing the given magnetic flux command $\phi_{ref}$ by, for example, the mutual inductance M, which is a motor constant of the induction motor 1. Moreover, the q-axis command current calculation unit 12 calculates q-axis command current $I_{qref}$ using, for example, the primary frequency command $\omega_1$, the q-axis current $I_q$, the d-axis command current $I_{dref}$ and the d-axis current $I_d$. In this case, the d-axis command current $I_{dref}$ and the q-axis command current $I_{qref}$ may be calculated, using any known calculation method.

The subtracters 19 and 20 obtain the difference between the q-axis command current $I_{qref}$ and the q-axis current $I_q$ and the difference between the d-axis command current $I_{dref}$ and the d-axis current $I_d$, respectively. The current control units 8A and 8B control current so that these differences are zero.

The respective values of the leakage inductance $\sigma L_{s0}$ and the primary resistance $R_{s0}$, out of the motor constants of the induction motor 1, are preset in the F/F command voltage calculation unit 9. Moreover, the primary frequency command $\omega_1$, the d-axis command current $I_{dref}$ and the q-axis command current $I_{qref}$ are input to the F/F command voltage calculation unit 9, and the F/F command voltage calculation unit 9 calculates the first term on the right hand side of equation (4) (the amount of primary impedance voltage drop of a motor) for each of the d and q axis components.

The adder 21 adds output from the current control unit 8B and the induced voltage command $E_{ref}$, which is output from the induced voltage command calculation unit 11. The adder 22 calculates command voltage $V'_{qref}$ by adding the q-axis component of the F/F command voltage calculation unit 9 and output from the adder 21. The adder 23 calculates command voltage $V'_{dref}$ by adding output from the current control unit 8A and the d-axis component of the F/F command voltage calculation unit 9.

The voltage error correction unit 16' obtains the command voltage $V_{ref}=[V_{dref} V_{qref}]^T$ by substituting the command voltage $V'_{dref}$, the command voltage $V'_{qref}$, and the voltage errors $\Delta V_d$ and $\Delta V_q$ output from the voltage error observer unit 7 into, for example, equations (12) and outputs the command voltage $V_{ref}=[V_{dref} V_{qref}]^T$ to the PWM inverter 3.

$$V_{dref}=V'_{dref}+\Delta V_d$$

$$V_{qref}=V'_{qref}-\Delta V_q \quad (12)$$

While, in the foregoing description, the current control units 8A and 8B and the F/F command voltage calculation unit 9 are provided, as shown in FIG. 3, the current control units 8A and 8B or the F/F command voltage calculation unit 9 may be provided to correct command voltage for an induction motor.

In this manner, even in a control device in which output from current control units that control motor current and/or output from an F/F command voltage calculation unit that calculates the amount of primary impedance voltage drop on the basis of motor current and electric constants of an induction motor is used, a voltage error observer is provided, and output command voltage and a slip frequency command are corrected, using a command voltage error. Thus, stable speed control in which, even when motor temperature changes, the accuracy of speed control does not deteriorate, can be achieved.

Since the control device according to the second embodiment of the present invention for an induction motor is constructed as described above, the following operational advantages are achieved: stable and highly accurate speed control can be achieved, and the present invention can be implemented, minimizing the influence of an axis displacement error on speed-sensorless vector control.

In the aforementioned embodiments, in order to improve the accuracy of calculation of a voltage error output from the voltage error observer unit 7, known correction processing may be performed on an output voltage error that occurs due to the influence of dead time, on-voltage, and the like of switching elements that constitute the PWM inverter 3.

In the aforementioned embodiments, stable and highly accurate speed control can be achieved. Thus, the present invention has a wide applicability to applications in environments in which a speed sensor cannot be used due to high temperature, high vibration, and the like, for example, general industrial equipment.

What is claimed is:

1. A control device comprising:
   a pulse width modulation (PWM) inverter unit that drives an induction motor;
   a slip calculator that calculates a first slip frequency of the induction motor;
   a current detector that detects motor current that passes through the induction motor;
   an adder that calculates a primary frequency by adding a speed command and a second slip frequency that are given;
   a command voltage generation unit that generates first command voltage from the primary frequency;
   a voltage error observer unit that estimates a command voltage error from the first command voltage and the motor current;
   a slip correction unit that calculates a slip correction amount from the command voltage error;
   an adder that calculates the second slip frequency by adding the first slip frequency and the slip correction amount; and
   a voltage error correction unit that corrects the first command voltage using the command voltage error and outputs second command voltage,
   wherein the PWM inverter unit applies the second command voltage to the induction motor.

2. The control device according to claim 1, further comprising:
   a current control unit that controls the motor current and outputs third command voltage; and
   an F/F command voltage calculation unit that calculates fourth command voltage on the basis of the motor current and electric constants of the induction motor,
   wherein the first command voltage is calculated using the third command voltage and/or the fourth command voltage.

3. The control device according to claim 1, wherein, when speed variation and load variation in the induction motor become constant, the slip correction unit stores the command voltage error and performs, after storing the command voltage error, comparison for comparing the command voltage error output from the voltage error observer unit with the stored command voltage error at predetermined intervals, and the slip frequency is corrected using a result of the comparison.

4. The control device according to claim 3, wherein the slip correction unit uses only a component corresponding to a magnetic flux axis of the induction motor, out of the command voltage error.

5. The control device according to claim 1, wherein the slip correction unit corrects the slip correction amount so as to increase the slip correction amount when the command voltage error changes in a plus direction and corrects the slip correction amount so as to decrease the slip correction amount when the command voltage error changes in a minus direction.

6. The control device according to claim 1, wherein the slip correction unit limits and outputs the slip correction amount on the basis of a magnitude of a rated slip frequency of the induction motor.

7. The control device according to claim 1, wherein the voltage error observer unit estimates motor current using electric constants of the induction motor and command voltage and calculates an error between the motor current detected by the current detector and the estimated motor current so that the error converges to zero, the error being estimated as disturbance voltage.

8. A control device comprising:
   a PWM inverter means for driving an induction motor;
   a slip calculator means for calculating a first slip frequency of the induction motor;
   a current detector means for detecting motor current that passes through the induction motor;

an adder means for calculating a primary frequency by adding a speed command and a second slip frequency that are given;

a command voltage generation means for generating first command voltage from the primary frequency;

a voltage error estimation means for estimating a command voltage error from the first command voltage and the motor current;

a temperature correction means for calculating a slip correction amount from the command voltage error;

an adder means for calculating the second slip frequency by adding the first slip frequency and the slip correction amount; and a voltage error correction means for correcting the first command voltage using the command voltage error and outputs second command voltage, wherein the PWM inverter means applies the second command voltage to the induction motor.

* * * * *